United States Patent [19]
Long et al.

[11] Patent Number: 6,098,992
[45] Date of Patent: Aug. 8, 2000

[54] VEHICLE COMPARTMENT SEALS

[76] Inventors: Neil G. Long, 2630 Randall Way; Scott Clare, 3381 Shawn Ct., both of Hayward, Calif. 94541

[21] Appl. No.: 09/082,436

[22] Filed: May 20, 1998

[51] Int. Cl.[7] ..................................................... F16J 15/02
[52] U.S. Cl. .......................... 277/637; 277/646; 277/913; 277/919; 277/921; 277/930; 49/477.1
[58] Field of Search ..................................... 277/630, 632, 277/637, 641, 645, 646, 913, 919, 921, 930; 296/37.6; 49/475.1, 477.1, 490.1, 498.1

[56] References Cited

U.S. PATENT DOCUMENTS

| | | | |
|---|---|---|---|
| 3,449,864 | 6/1969 | Prost-Dame et al. | 49/477.1 |
| 3,869,873 | 3/1975 | Thomas | 49/477.1 X |
| 4,135,761 | 1/1979 | Ward | 296/37.6 |
| 4,761,917 | 8/1988 | Knecht et al. | 49/477.1 |
| 4,805,347 | 2/1989 | Smith | 49/477.1 |
| 5,339,488 | 8/1994 | Maass | 49/477.1 X |
| 5,361,542 | 11/1994 | Dettloff | 49/477.1 |
| 5,390,974 | 2/1995 | Theodorakakos | 49/477.1 X |
| 5,489,104 | 2/1996 | Wolff | 49/477.1 X |

*Primary Examiner*—Anthony Knight
*Assistant Examiner*—Karlena D. Schwing
*Attorney, Agent, or Firm*—L. E. Carnahan

[57] ABSTRACT

An anti-freezing seal for vehicle compartments, doors, trunks, etc. In cold climates, one of the problems is freezing shut of vehicle doors, for example, due to the moisture which accumulates on the seals during the daytime and then freezes at night. This is a problem for all vehicle compartment lids using seals to prevent leakage of moisture or dust into the compartment and can be resolved by heated or vacuum actuated seals. A heated anti-icing seal may be similar in construction with various existing compartment lid or door seals, which include a bulb or compression section, means for attaching the bulb to a compartment flange, a reflective shield, heat strip, and electrical wires or electric clips adapted to be connected to a DC or AC power supply via, for example, a switch, thermostat, and timer. The attaching means may be an adhesive or a seal setting flange compartment having grippers. The vacuum actuated seal differs from the existing conventional seals in that the bulb or compression section is flexible and connected to a vacuum source such that upon activation of the vacuum system the bulb collapses to break frost between the seal and the compartment lid.

37 Claims, 5 Drawing Sheets

VEHICLE COMPARTMENT SEALS

BACKGROUND OF THE INVENTION

The present invention relates to seals, particularly to heated or vacuum actuated vehicle compartment and door seals, and more particularly to anti-freezing seals for vehicle compartment lids or doors, and which may include a heated embodiment with thermostatic controller and timer and electrical connector therefor, for activating and controlling an electrical power supply for heating an element within the seal, and to a vacuum actuated embodiment which is collapsed by vacuum pressure whereby the seal is withdrawn from the door or lid.

In cold climates, it is common to have the doors and/or compartment (truck) lids, as well as compartment lids on utility vehicles, freeze shut. The freezing is usually due to moisture which accumulates on the door or compartment lid edges and/or the seals located about the openings covered by the doors or compartment lids. One of the common approaches to opening frozen doors, for example, has been to pour hot water around the edges, which melts the ice and allows the door to open. However, in weather conditions wherein the temperature is below freezing, the pouring of hot water is a mere one time solution as the water will quickly freeze and, unless the door is maintained open for a period of time, it will freeze shut again. A more recent solution to this door freezing problem is the use of blow-dryers which heat the ice accumulated on the door edges or seals, thus allowing the door to open. Again, unless the blow-drying is continued to melt any remaining ice and dry the door edges and seal, in freezing temperature conditions the door will refreeze shut after being closed for a time period. In severe freezing conditions, vehicle doors have been known to freeze shut during operation creating an unsafe condition for occupants of the vehicle. However, under such conditions, the frozen door can be forced open from within the vehicle, which often causes damage to the door seals. Similar lid freezing problems arise in vehicle trunks and utility-type vehicles which have storage compartments. If no hot water or blow-dryer, etc. is available, it becomes necessary to pry the lid open, which often results in damage to the lid or seal, or both.

Thus, there has been a long-felt need for eliminating the problems associated with frozen vehicle doors or compartment lids. The present invention provides solutions to these problems by providing heated anti-icing seals or a vacuum actuated seal for vehicle doors, compartment lids, etc., whereby the seals are heated by an electrical heat strip embedded in or otherwise secured to the seals, and the vacuum actuated seals are connected to the vacuum source which cause the seals to collapse breaking the frost bead. The heated anti-icing seals are electrically heated, such as by the vehicle's direct current (DC) power supply, or by an associated alternating current (AC) power supply located on or off the vehicle. The invention utilizes electrical clips to connect a power supply to the heated seal. Electrical heating can be controlled by a simple manual switch, a thermostatically controlled switch, a timer actuated switch, or a timer actuated thermostatic switch. The vacuum actuated seals may be controlled by connection via a switch to the vacuum system of the vehicle so as to collapse when the vacuum system is activated.

SUMMARY OF THE INVENTION

It is the object of the present invention to eliminate freezing shut of vehicle doors and compartment lids.

A further object of the invention is to provide a seal for a vehicle compartment lid or door which eliminates freezing of the seal to the lid or door.

A further object of the invention is to provide a means for removing frost between a compartment lid and its seal.

A further object of the invention is to provide a heated or vacuum seal for vehicles.

Another object of the invention is to provide a heated anti-icing seal for vehicle doors and compartment lids.

Another object of the invention is to provide a vacuum controlled seal for vehicle compartment doors or lids, and means for controlling same.

Another object of the invention is to provide clips for connecting a heating element of a seal to a power supply.

Another object of the invention is to provide a heated seal having electrical power and control means.

Another object of the invention is to provide a thermostatically heated anti-icing seal for vehicle compartment doors or lids.

Other objects and advantages of the present invention will become apparent from the following description and accompanying drawings. The present invention broadly involves vehicle compartment seals which eliminate freezing of the compartment lid to the seal or remove frost between the lid and seal. The anti-freezing seal may be of a heated anti-icing type or vacuum type which is collapsed whereby the seal breaks contact with the compartment lid or door. The heated anti-icing seal is electrically heated and connected via a switch, thermostat, and/or timer to a power supply, either DC or AC. Electrical connection clips are utilized to connect a power source to a heating element in the seal. The seal may be constructed similar to conventionally used vehicle seals and the heated type, including an electrical heating wire or strip in the bulb section to heat the seal. The vacuum seal uses a flexible bulb section and may be connected to a vacuum source of the vehicle through a switch. The heated seal may be energized by a timer set to heat the seal a required time period before normal use of the compartment lid or door, or may heat continuously in extremely cold conditions. The vacuum seal is collapsed to be in non-sealing relation with the compartment lid or door during vacuum activation of the vacuum source of the vehicle and, for example, may be energized via a switch at the time the vehicle engine is started.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The present invention is directed to eliminating problems associated with freezing of vehicle compartment doors or lids to the seals located about the openings of the compartment. The term vehicle compartment lid as used hereinafter includes vehicle doors, trunks, storage compartments, sunroofs, etc., where an opening is to be removably covered. While the invention will be described hereinafter for use with hidden storage compartments in one or more side panels of pickups, vans and sports utility vehicles, such as a bed of a pickup truck as described and claimed in U.S. Pat. No. 5,567,000 issued Oct. 22, 1996, and in vehicles as in copending U.S. application Ser. No. 08/910,516 filed Aug. 2, 1997 entitled "Hidden Storage For Vehicles", now U.S. Pat. No. 5,823,598 issued Oct. 20, 1998, it may be utilized in any vehicle seal to prevent freezing or eliminate frost between the seal and compartment lid or to thaw frost located between the seal and lid.

To prevent or reduce entry of moisture or dust into vehicle compartments, seals which extend about the periphery of the compartments are positioned to be contacted by the compartment lid when closed. However, in cold weather conditions, the seals form moisture thereon which freezes the lid to the seal. The present invention overcomes this freezing problem by the use of heated anti-icing seals or by collapsible vacuum seals.

Figure 1:
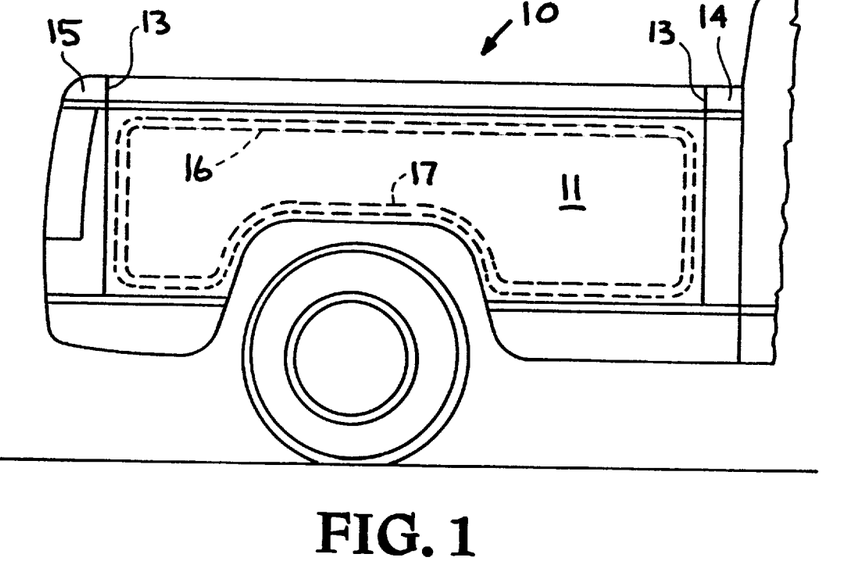
FIG. 1 illustrates a hinged side panel of a vehicle having hidden storage therein illustrating a sealing arrangement for the hinged side panel.
Figure 3:
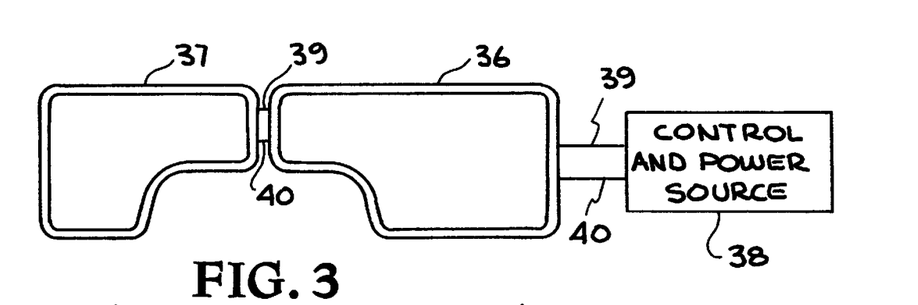
FIG. 3 schematically illustrates an electrically heated seal arrangement having two sections with a control and power source therefor.
Figure 4:
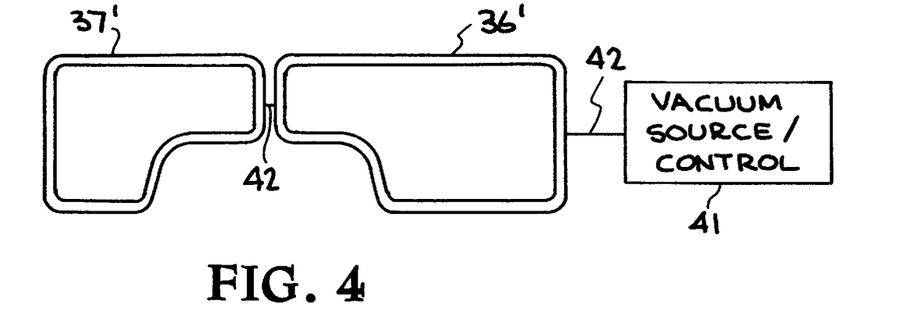
FIG. 4 schematically illustrates a two section vacuum seal arrangement similar to that illustrated in FIG. 3 with a vacuum source/control.

Referring now to the drawings, FIG. 1 illustrates a pickup truck bed having the side panels hinged to provide hidden storage thereunder as in the above-referenced patent and copending application. The pickup bed 10 is provided with a hinged side panel section or compartment lid 11 which, for example, extends between vertical cut lines 13, and thus can be raised to expose the interior of a storage area or lowered to close access to the storage area. Note that the hinged side panel section or lid 11, when closed, is of the same contour as the remainder of the side panel sections 14 and 15. If desired, the hinged side panel section 11 may include panel sections 14 and 15. A seal assembly 16 is mounted adjacent the periphery of the hinged side panel 11 having a power source connection indicated at 17, which may be an electrical power connection clip, such as described hereinafter, to which is connected an electrical power source and control such as seen in FIG. 3, or which may be a connection to a line or conduit for connection to a vacuum source, as shown in FIG. 4. The seal assembly 16 is mounted to the compartment behind the hinged side panel section It by any known seal mounting clip or by an adhesive or, if desired, mounted to the side panel section 11. In hidden storage compartments, which extend the entire length of the hinged side panel section 11, an interconnected two piece seal may be utilized as shown in FIGS. 3 and 4, and the two piece seal would be connected to an electrical source or vacuum source at any desired point on the seal. Also, with the two piece seal assembly, it may be desirable to mount the seal to an inner surface of lid instead of the body of the pickup bed so as to be adjacent the outer periphery of the hinged side panel. It is recognized that various seal configurations and mounting means may be utilized.

Figure 2:
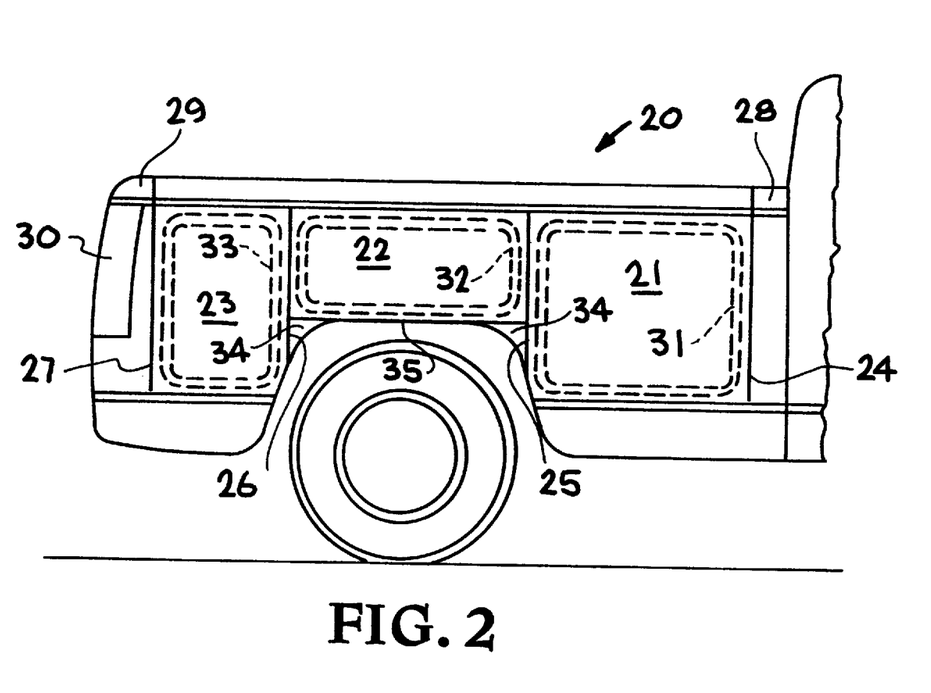
FIG. 2 illustrates a vehicle with multiple hinged side panel sections with seals.
Figure 12:
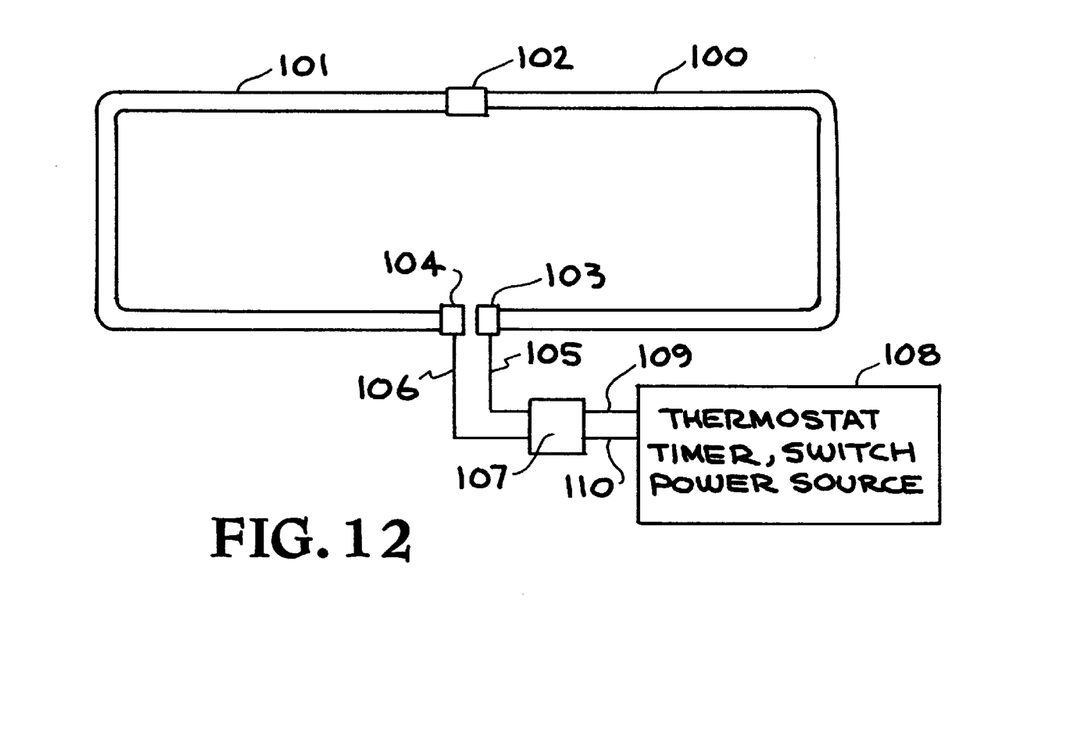
FIG. 12 illustrates an electrical heating seal and control arrangement for a two-section single seal such as in the FIG. 1 embodiment.
Figure 14:
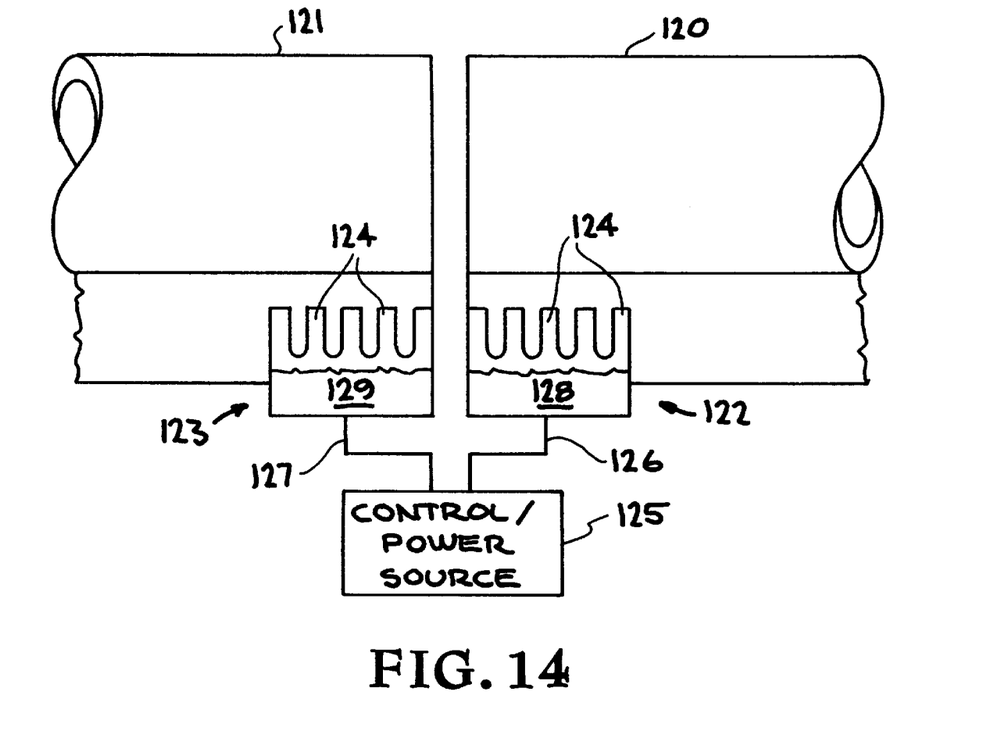
FIG. 14 illustrates an electrical clip arrangement, with cut away sections, as in FIG. 12 utilizing two clips connected to a control/power source, as in FIG. 13.

FIG. 2 illustrates a vehicle hidden storage system wherein the side panel of a bed, similar to that of FIG. 1, is provided with three hinged sections with a separate seal assembly for each hinged section. As shown, the vehicle or pickup bed 20 is provided with hinged side panel sections or compartment lids 21, 22 and 23 formed intermediate vertical cuts 24, 25, 28 and 27, and as in the FIG. 1 embodiment when the hinged side panel sections are closed, the only difference from an external view of a bed without the hidden storage system is the vertical cuts 24–27. The hinged side panel sections or lids 21–23 may be hinged horizontally or vertically via hidden hinges and provided with hidden latch/lock mechanisms as described, for example, in the above referenced patent and copending application's latch/lock mechanisms. Also, the hinged side panel sections 21 and 23 may extend to include bed sections 28 and 29 whereby they extend to the front edge and rear edge of the pickup bed 10, thus eliminating the vertical cuts 24 and 27. The tail light assembly 30 of bed 10 may or may not be hinged with side panel section 23. Seal assemblies 31, 32 and 33 are mounted in each compartment of bed 10 such that hinged side panel sections 21–23 contact the seal assemblies in their closed position. Each seal assembly 31–33 includes a connector, not shown, such as connector 17 in FIG. 1 for connection to an electrical power source/control, as shown in FIGS. 3, 12 and 14, for example, or to a line to a vacuum source as in FIG. 4. If desired, side panel section 22 may be constructed to form a sliding compartment, or the hinged section 22 may include the curved sections 34 of the side panel above the wheel well, thereby eliminating the horizontal cut 35.

FIG. 3 illustrates seal assemblies at 36 and 37 connected to a control and power source generally indicated at 38 by pairs of electrical leads 39 and 40. The control and power source 38 may be a simple switch connected to the vehicle battery, a thermostatically controlled switch connected to the vehicle battery, a timer actuated switch, which may or may not be thermostatically controlled, connected to either the vehicle battery or to an AC power supply located on or off the vehicle. With a timer arrangement, the timer can be set to initiate heating of the seal for a specified time period prior to the intended use of the vehicle whereby the seal assemblies are heated to overcome any freezing of the seal assemblies to their associated compartment lids.

FIG. 4 illustrates seal assemblies 36' and 37' connected to a vacuum source/control 41 by a conduit or line 42. The vacuum source/control 41 may constitute a simple switch intermediate the seals and a vacuum pump on the vehicle engine, or to a separate vacuum source mounted on the vehicle. As briefly described above, and illustrated in detail in the FIGS. 10–11 embodiment, the seal assemblies 36' and 37' would include a flexible wall section which in its collapsed condition (FIG. 11) is slightly removed from the inner surface of an adjacent compartment lid, such as a hinged side panel section, and in its normal expanded condition (FIG. 10) provides a seal adjacent the compartment lid. Thus, the vacuum source only needs to operate to break frost between the seal and lid, and is not required under the normal expanded condition of the seal. However, it is recognized that the vacuum seal arrangement of FIG. 4 is not as effective as the heated seal arrangement of FIG. 3 in preventing freezing or removal of frost between the lid and seal. However, the FIG. 4 arrangement does provide a simple anti-freezing seal arrangement.

Figures 5, 6:
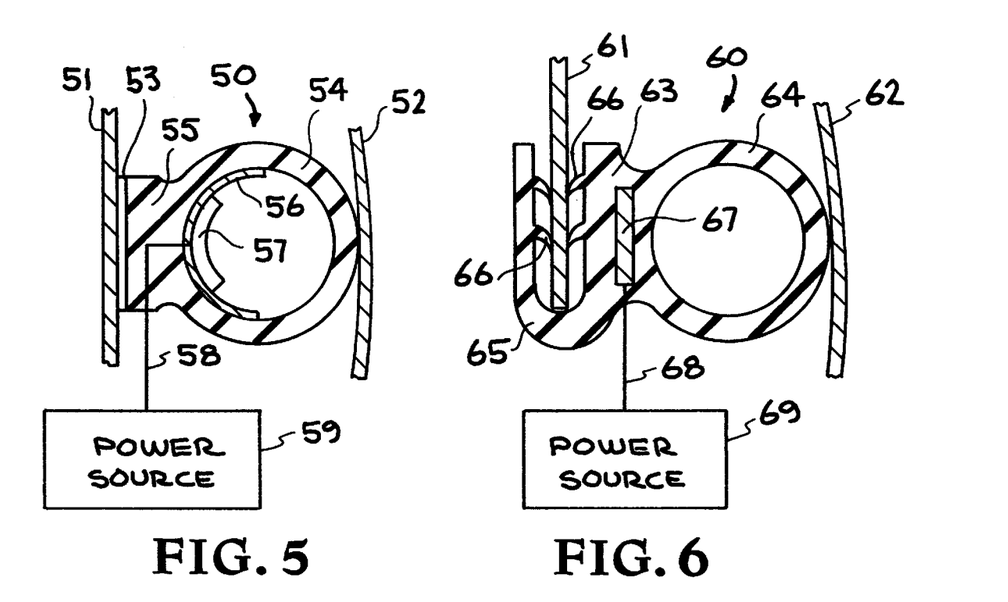
FIGS. 5–9 illustrate in cross-section embodiments of the heated anti-icing seals made in accordance with the present invention.

FIG. 5 illustrates a first embodiment of a heated anti-icing seal assembly made in accordance with the present invention. The seal assembly generally indicated at 50 is mounted intermediate a compartment body structure 51 and a compartment lid or hinged panel section 52 by an adhesive mounting strip 53. The seal assembly 50 includes a bulb or compression section 54 integral with a body section 55 attached to the mounting strip 53. Within the bulb section 54 are a reflective shield 56 and a heating element 57, with an electrical wire 58 extending from the heating element 57 through the reflective shield 56 and through the body section 55 of seal assembly 50 for connection to a controller/power supply or source 59, such as described above with respect to FIG. 3 and hereinafter with respect to FIGS. 12–14. It is understood that a single seal assembly 50 may extend entirely around a compartment opening as in FIG. 1, or the overall seal assembly extending around the compartment may be composed of a number of interconnected sections or lengths each being constructed as shown in FIG. 3 and electrically connected as in FIG. 12. However, a single seal assembly requires less electrical connections and thus is preferred, it being recognized that for very large openings a single seal assembly may be less efficient than a plurality of similarly connected seal assemblies, such as shown in FIG. 3.

FIG. 6 illustrates another embodiment of a heated anti-icing seal. The seal assembly, generally indicated at 60, is designed to be secured to a flange 61 of a compartment structure and in abutment with a hinged panel section or compartment lid 62. The seal assembly 60 comprises a central body section 63, a bulb or compression section 64, and a flange attachment or gripping section 65 composed of an elongated U-shaped member having a plurality of inwardly extending flexible fingers 66 which grip the flange 61. Central body section 63 is provided with a buried heating strip or element 67 and to which is connected an electrical wire 68, adapted to be connected to a power source or supply 69. Activation of the heating strip 67 results in heating of the bulb section 64. If desired, a reflective shield, similar to that of FIG. 5, can be located adjacent the heating strip 67 on the side opposite the bulb section 64 to increase the heating of the bulb section. Various embodiments of the heating strip or element 67 in place of the bar-type shown may be used, including straight or spiralled wires, a spiral strip, and a strip including a series of U-shaped members. Also, if desired, an insulator member may be positioned about flange 61.

Figure 7:
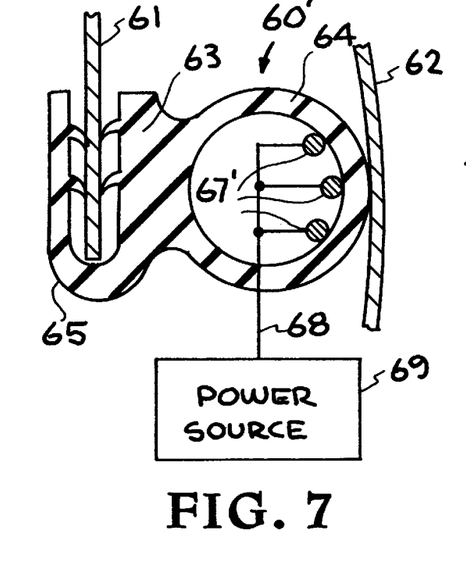

FIG. 7 illustrates an embodiment of a heated seal assembly wherein the heating elements are secured to or embodied in the outer portion of the compression or bulb section of the seal assembly. In this embodiment, the heating elements comprise a plurality of resistive wires secured to an inner wall of the bulb section of the seal assembly. The seal assembly, generally indicated at 60', is similar in construction to the FIG. 6 embodiment, designed to be secured to a flange 61 of a compartment structure and in abutment with a compartment lid (hinged panel section) 62, and corresponding components of the seal assembly are given corresponding reference numerals. The difference between the embodiments of FIG. 6 and FIG. 7 is the location of the heating element. In FIG. 6, the heating element 67 is buried in the body section 63 while in the FIG. 7 embodiment element is composed of a plurality of resistive wires 67' secured in an inner wall of an outer portion of bulb section 64, as by bonding, adhesive, etc. While three wires 67' are illustrated, a single resistive member, for example, may be utilized as well as arrangements including an embedded heating element in the outer portion or the bulb section. The heating element location of the arrangement of FIG. 7 enables faster heating of the bulb section compared to the buried heating element arrangement of FIG. 6.

Figure 8:
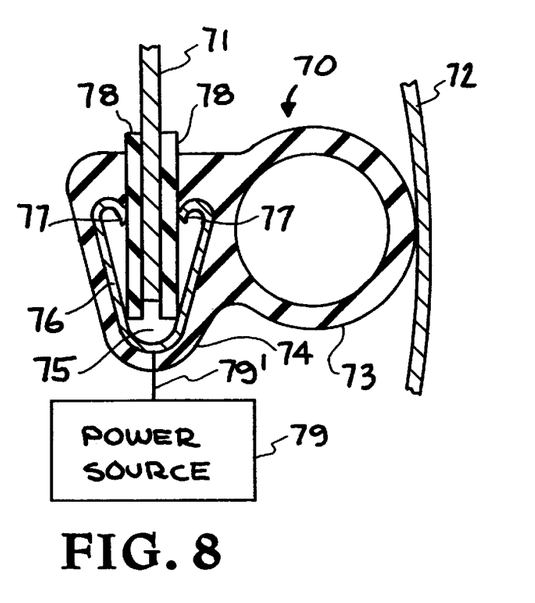
Figure 13:
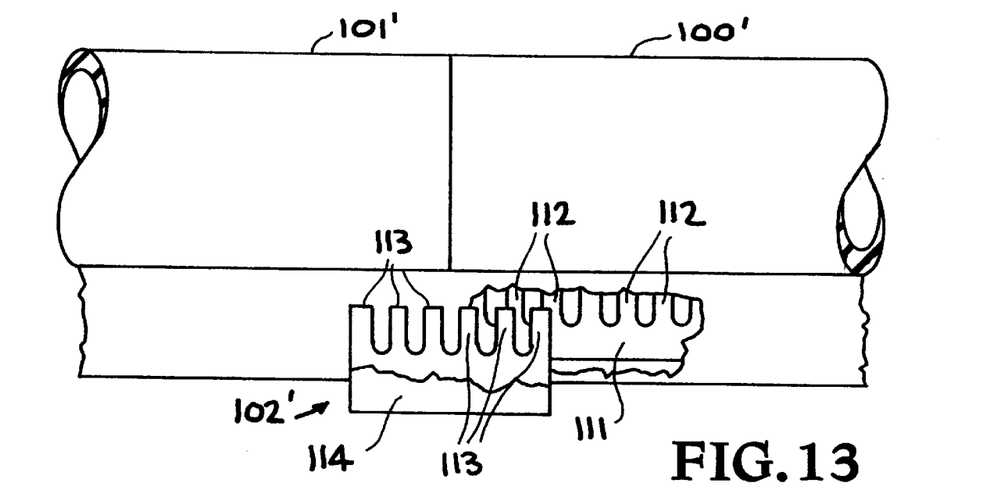
FIG. 13 is a partially cut away view of the electrical connection between an electrical clip and a resistive heating element in the seal, such as in the embodiment of FIG. 8.

FIG. 8 illustrates an embodiment of a heated seal assembly wherein the resistive or heating element also functions as a clip for securing the seal assembly to a flange of a compartment structure. As shown, the seal assembly generally indicated at 70 is secured to a flange 71 of a compartment structure and in abutment with a compartment lid (hinged panel section) 72. The seal assembly 70 includes a bulb or compression section 73 and a flange attachment or gripping section 74. The section 74 is of an elongated U-shaped configuration defining an opening 75 within which a flexible U-shaped resistive or heating member or element 76 is located, with element 76 having two inwardly extending curved flanges 77 which abut insulation layers 78 located on each side of flange 71. Each of the flanges 77 may be of a multi-prong or segmented type as shown in FIG. 13. Heating element 76 is electrically connected to a power source 79 via an electrical lead or wire 79'. Thus, the flexible member 76 functions as the heating element and also as the gripper or clipping element to retain seal assembly 70 secured on flange 71. Note that flanges 77 of element 76 must be constructed so as not to penetrate the insulation layers 78, as contact between a flange 77 of element 76 and flange 71 would produce an electrical short circuit.

Figure 9:
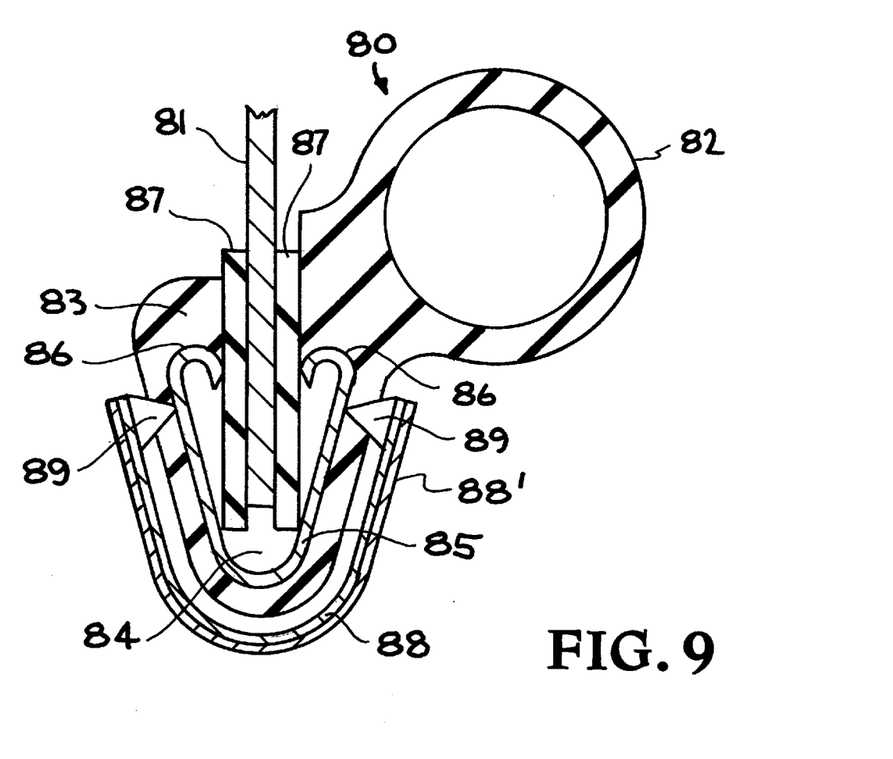

FIG. 9 illustrates an embodiment of a seal assembly generally similar to the FIG. 8 embodiment, except for an electrical connector clip which contacts the resistive or heating member or element, whereby electrical power is directed to the heating element, as shown in greater detail in FIGS. 12–14. The seal assembly of FIG. 9, generally indicated at 80, is secured to a flange 81 of a compartment structure and includes a bulb or compression section 82 and a flange attachment or gripping section 83, the bulb or compression section 82 is adapted to abut a compartment lid or hinged panel section, not shown, similar to the embodiments of FIGS. 5–8. Section 83 is of an elongated U-shaped configuration defining an opening 84 in which a flexible U-shaped heating element 85 is located and which includes inwardly extending curved flanges 86 which abut insulation layers 87 and function to secure the seal assembly 80 to the flange 81, as described above with respect to FIG. 8. A flexible U-shaped electrical connector or clip 88 having an insulating layer 88' and having inwardly extending contacts or prongs 89 which penetrate the gripper section 83 to connect the heating element 85 to a power supply, not shown, but similar to the embodiments of FIGS. 12–14. The clip or connector 88 may be of a multi-prong type as shown in FIGS. 13 and 14.

Figure 10:
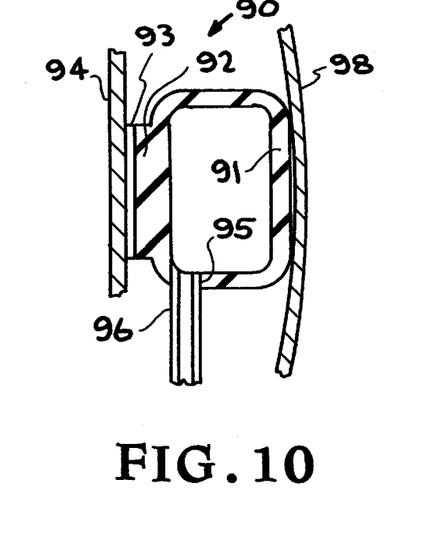
FIGS. 10 and 11 illustrate an embodiment of the vacuum seal made in accordance with the invention, with FIG. 11 showing the seal collapsed.
Figure 11:
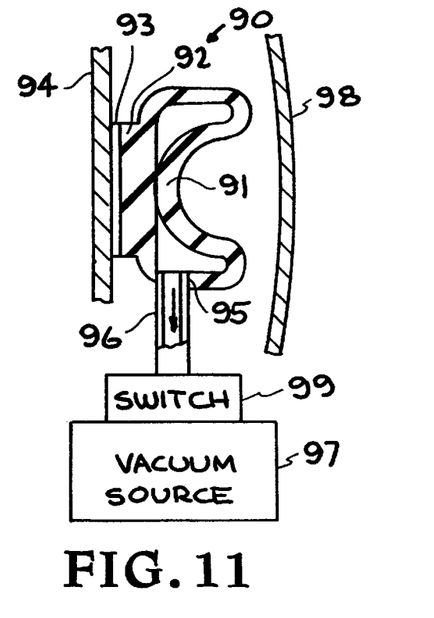

FIGS. 10 and 11 illustrate an embodiment of a vacuum seal assembly, generally indicated at 90, having a flexible (expandable/contractable) section 91, and a body section 92 to which an adhesive securing strip 93 attaches the seal assembly to a compartment structure or flange 94. The flexible section 91 includes an opening 95 in which is secured a vacuum line or tube 96 to be connected to a vacuum source 97, as in FIG. 4. In normal condition, as shown in FIG. 10, the flexible section 91 is expanded to contact a hinged panel section or compartment lid 98, and in its contracted or collapsed condition, as shown in FIG. 11, the flexible section 91 is withdrawn from contact with the compartment lid 98. As shown in FIG. 11, the vacuum source 97 may be the vehicle engine vacuum system or a vacuum pump driven by the engine or another power source.

The vacuum source 97 is connected via a switch 99 in line 96 whereby a vacuum is pulled so as to collapse flexible section 91 of seal 90 to break frost between the seal and the lid 98.

FIG. 12 illustrates a heated seal assembly, such as illustrated in FIG. 1, for example, but which utilizes a plurality of interconnected seal members, connected to a power supply/controller via electrical contact clips, such as illustrated in FIGS. 12 and 14, and which may utilize the U-shaped heating element, as illustrated in FIGS. 9 and 13. While FIG. 12 illustrates two seal assemblies 100 and 101 interconnected end to end by a connector 102, such as shown in FIG. 13 for example, any number of seal assemblies may be utilized. In the FIG. 12 arrangement, each of seal assemblies 100 and 101 terminate in a connector or clip 103 and 104 respectively, which are connected by electrical leads 105 and 106 to an adaptor 107, by which either an alternating current (AC) or a direct current (DC) power supply may be connected via a thermostat, timer, switch, or combination, to a power source or supply, all indicated generally at 108 and connected electrically via electrical leads 109 and 110 to adaptor 107. Since those skilled in the electrical field have a working understanding of how a simple switch or a thermostat or thermostatically controlled switch and/or a timer can be interconnected between either a DC power source, such as the vehicle battery, or an auxiliary battery and the adaptor 107, or between an AC power source located on or off the vehicle and the adaptor 107, description or illustration of a detailed electrical system is deemed unnecessary.

FIG. 13 illustrates a clip or connector, such as the connector 102 in FIG. 12, by which a pair of seal assemblies, such as illustrated in FIG. 9, can be electrically interconnected. Here seal assemblies 100' and 101' are connected end-to-end by a flexible U-shaped clip or connector 102'. Each of seal assemblies 100' and 101' utilize a U-shaped heating element 111, only one shown, such as illustrated at 76 and 85 in FIGS. 8 and 9. As seen in FIG. 13, heating element 111 of each of seal assemblies 100' and 101' includes numerous inwardly curved flanges 112, on each leg of the U-shaped element, such as shown at 77 and 86 in FIGS. 8 and 9. Connector or clip 102', of a U-shaped configuration, such as shown at 88 in FIG. 9, includes a plurality of contacts or prongs 113, such as prongs or contacts 89 of FIG. 9, on each leg of the U-shaped connector, only one leg being shown in FIG. 13. The connector or clip 102' is electrically insulated as indicated at 114 with the prongs 113 being shown exposed. Thus, with the ends of seal assemblies 100' and 101' being in abutment, the flexible U-shaped connector or clip 102' is secured to the ends of the seal assemblies with sufficient pressure to cause the contacts or prongs 113 to penetrate the seal assemblies so as to contact the flanges 112 of the U-shaped heating elements 111 of seal assemblies 100' and 101', thereby producing an electrical contact between clip or connector 102' and heating elements 111 when the clip or connector 102' is connected to an electrical power supply, not shown but similar as shown in FIG. 12 or 14.

FIG. 14 illustrates an embodiment utilizing two seal assemblies 120 and 121, which are of the type having heating elements constructed as shown in FIGS. 8, 9 and 13. Here each seal assembly 120 and 121 is connected via a clip or connector 122 and 123, having prongs or contacts 124, and of the type illustrated in FIGS. 9 and 13, to a control/power source 125 via electrical leads 126 and 127 respectively. Each of clips or connectors 122 and 123 includes an outer insulator layer 128 and 129. The seal assemblies 120 and 121 may be interconnected as in FIG. 12 or mounted on separate vehicle compartments. If mounted on separate compartments, each of the seal assemblies must be properly electrically connected circuit-wise such that electrical current flowing therethrough causes heating of the heating element therein.

It has thus been shown that the present invention provides means for eliminating the problems related to vehicle compartment lids freezing shut. This is accomplished by the use of seals adjacent the compartment lid which can be heated or evacuated. The seal is attached to a heating source or to a vacuum source via appropriate control mechanisms. In the heated anti-icing approach, frost which may have accumulated on the surface of the seal is removed by timely actuation of a heating element of the seal, which heating may be controlled by timer, thermostatically, or manually. Electrical clips or connectors are provided to interconnect the seals with a power source. In the vacuum approach, the seal is evacuated causing collapse, whereby the seal collapse causes breaking of the frost which accumulates thereon when in contact with the compartment lid.

While particular embodiments of the seals, electric connectors, and controls have been illustrated and/or described to exemplify and teach the principles of the invention, such are not intended to be limiting. Modifications and changes may become apparent to those skilled in the art, and it is intended that the invention be limited only by the scope of the appended claims.

What is claimed is:

1. In a vehicle having at least one compartment lid, the improvement comprising:
   heated seal means for eliminating frost and preventing the at least one compartment lid from freezing shut,
   said heated seal means comprising at least one heated seal operatively connected to a power supply and by means selected from the group consisting of a thermostatically controlled switch, a timer, and a combination of a timer and thermostatically controlled switch.

2. The improvement of claim 1, wherein said at least one heated seal including a body section, a compressible section, and means for securing said body section to a point of use, said heated seal including at least one electrical heating element adapted to be connected to said power supply.

3. The improvement of claim 2, wherein said at least one electrical heating element is located in said compressible section.

4. The improvement of claim 2, additionally including a heat reflective member positioned adjacent one side of said electrical heating element.

5. The improvement of claim 2, wherein said at least one electrical heating element is located in said body section.

6. The improvement of claim 2, wherein said securing means comprises a quantity of adhesive material.

7. The improvement of claim 6, wherein said adhesive material comprises an adhesive strip secured to said body section.

8. The improvement of claim 2, wherein said securing means includes a U-shaped member having inwardly extending flexible members therein.

9. The improvement of claim 8, wherein said U-shaped member is integral with said body section.

10. The improvement of claim 8, wherein said U-shaped member comprises said electrical heating element.

11. The improvement of claim 10, additionally including an electrically conducting clip secured to said U-shaped member and adapted for electrically connecting said U-shaped member to an associated power source.

12. The improvement of claim 2, wherein said at least one electrical heating element comprises at least one resistive component located adjacent an area of said compressible section opposite said body section.

13. The improvement of claim 12, wherein said at least one resistive component comprises at least one resistive wire located within the compressible section.

14. In a vehicle having at least one compartment lid, the improvement comprising:

seal means for eliminating frost and preventing the at least one compartment lid from freezing shut, said seal means comprising at least one vacuum activated seal operatively connected to a vacuum source, and means for controlling said source.

15. The improvement of claim 14, wherein said seal includes a collapsible section which is collapsed by vacuum applied thereto.

16. A heated anti-icing seal comprising:

at least one seal assembly having a compressible section and a section for securing said at least one seal assembly to a point of use, and electrical means for heating said compressible section.

17. The heated anti-icing seal of claim 16, additionally including an electrical power supply operatively connected to said electrical means, and means for controlling electrical energy from said power supply to said electrical means.

18. The heated anti-icing seal of claim 17, wherein said electrical power supply is selected from the group consisting of direct current and alternating current power supplies.

19. The heated anti-icing seal of claim 17, wherein said controlling means is selected from the group consisting of a switch, thermostatic switch, timer, and timer/thermostatic assembly.

20. The heated anti-icing seal of claim 17, wherein said electrical means is located within said compressible section.

21. The heated anti-icing seal of claim 16, wherein said electrical means includes a heating element and a heat reflective member.

22. The heated anti-icing seal of claim 16, wherein said securing means is selected from the group consisting of adhesive means and gripping means.

23. The heated anti-icing seal of claim 22, wherein said securing means comprises a gripper means, said gripper means being constructed to comprise said electrical means.

24. The heated anti-icing seal of claim 23, additionally including an insulated clip adapted to be electrically secured to said gripper means and adapted to be electrically connected to an electrical power supply.

25. The heated anti-icing seal of claim 16, comprising a plurality of seal assemblies.

26. The heated anti-icing seal of claim 25, wherein said plurality of seal assemblies are connected end-to-end.

27. The heated anti-icing seal of claim 25, wherein said end-to-end seal assemblies are connected by an insulated and electrically conductive clip.

28. The heated anti-icing seal of claim 25, wherein said plurality of seal assemblies are each located in separate vehicle compartments adjacent a compartment lid.

29. The heated anti-icing seal of claim 16, wherein said at least one seal assembly additionally includes a body section located intermediate said compressible section and said securing means.

30. The heated anti-icing seal of claim 29, wherein said electrical means includes a member located in said body section.

31. The heated anti-icing seal of claim 29, wherein said securing means includes a U-shaped member having flexible members therein.

32. The heated anti-icing seal of claim 31, wherein said U-shaped member comprises said electrical means, and additionally including insulating means located adjacent said flexible members.

33. The heated anti-icing seal of claim 32, additionally including an electrically insulated flexible clip having inwardly extending prongs, said clip being positioned about said U-shaped member, with said prongs in contact with said U-shaped member, said clip being adapted to electrically connect said U-shaped member to an electrical power supply.

34. An electrically heated seal assembly for vehicle compartment lids, said seal assembly including at least one seal comprising:

a compressible section, and at least a gripper section for securing said seal assembly to a point of use, said gripper section including a U-shaped electrically conductive heating member having a plurality of inwardly extending flanges adapted to secure said seal assembly to a point of use, a flexible clip assembly having inwardly extending members and constructed to extend about at least a portion of said U-shaped heating member whereby said inwardly extending members contact said U-shaped member, an electrical power supply, means for connecting said power supply to said clip assembly, and means for controlling electrical energy from said power supply to said U-shaped heating member.

35. The heated seal assembly of claim 34, wherein said seal assembly comprises a plurality of seals.

36. The heated seal assembly of claim 35, wherein said plurality of seals are connected end-to-end by an electrically insulated clip assembly.

37. The heated seal assembly of claim 35, wherein said plurality of seals are each connected to said power supply by a clip assembly.

* * * * *